United States Patent [19]

Hino

[11] Patent Number: 5,018,244
[45] Date of Patent: May 28, 1991

[54] HINGE DEVICE FOR COUPLING A MEMBER ROTATABLE TO ANOTHER

[75] Inventor: Isao Hino, Komagane, Japan

[73] Assignee: NHK Spring Co., Ltd., Yokohama, Japan

[21] Appl. No.: 536,445

[22] Filed: Jun. 12, 1990

[30] Foreign Application Priority Data

Jun. 14, 1989 [JP] Japan ................... 1-150856

[51] Int. Cl.$^5$ ............................................. E05D 11/08
[52] U.S. Cl. ........................................ 16/342; 16/337; 16/85
[58] Field of Search ...................... 16/82, 85, 306–307, 16/337, 339, 342, 273, DIG. 10, DIG. 17

[56] References Cited

U.S. PATENT DOCUMENTS

| 341,636 | 5/1886 | Breithut | 16/339 |
| 2,862,229 | 12/1958 | Bacca | 16/342 |
| 2,883,254 | 4/1959 | Bacca | 16/337 |
| 4,356,594 | 11/1982 | Grosemans . | |
| 4,428,094 | 1/1984 | Emain . | |
| 4,620,344 | 11/1986 | Lewis, Jr. | 16/339 |
| 4,630,333 | 12/1986 | Vickers . | |

FOREIGN PATENT DOCUMENTS

| 0051022 | 5/1982 | European Pat. Off. . |
| 640486 | 12/1936 | Fed. Rep. of Germany . |
| 888223 | 8/1953 | Fed. Rep. of Germany . |
| 3030613 | 8/1980 | Fed. Rep. of Germany . |
| 689413 | 3/1953 | United Kingdom . |

Primary Examiner—Richard K. Seidel
Assistant Examiner—Edward A. Brown
Attorney, Agent, or Firm—Frishauf, Holtz, Goodman & Woodward

[57] ABSTRACT

A hinge device having a bearing member and a shaft. The bearing member has a sleeve section having a through hole, in which the shaft is inserted. The inner circumferential surface of the sleeve section contacts the circumferential surface of the shaft. The sleeve section has slits which extend parallel to the axis of the sleeve section. Ring springs are mounted on the sleeve section. In their non-expanded state, the springs have an inside diameter smaller than the outside diameter of the shaft. The ring springs tighten the sleeve section onto the shaft, thus generating a frictional force between the sleeve section and the shaft.

15 Claims, 5 Drawing Sheets

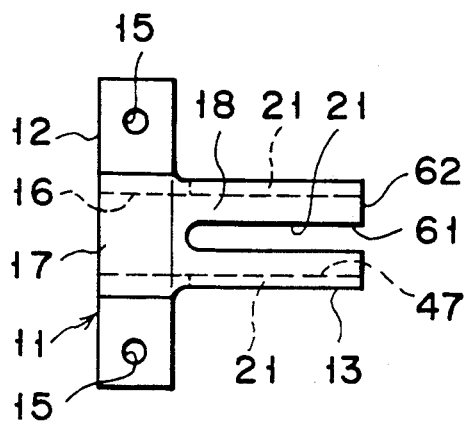
F I G. 13
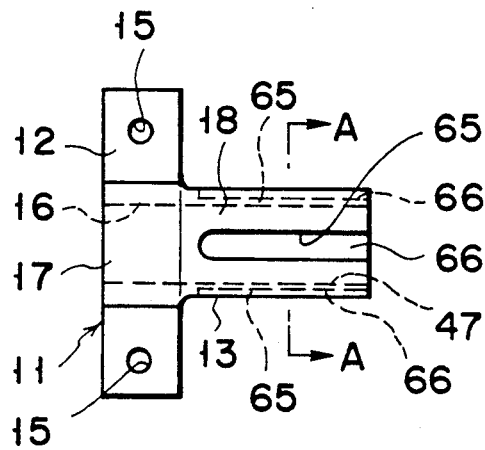
F I G. 14
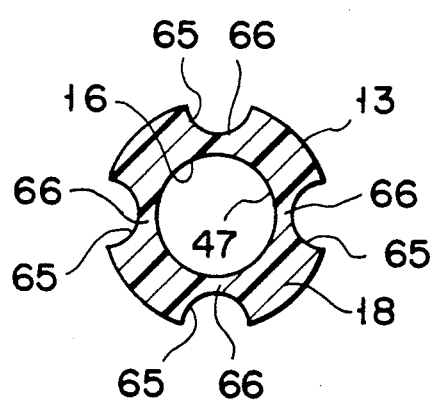
F I G. 15

HINGE DEVICE FOR COUPLING A MEMBER ROTATABLE TO ANOTHER

BACKGROUND OF THE INVENTION

1. Field of the Invention

The present invention relates to a hinge device for coupling a member rotatably to another, and more particularly a hinge device for coupling two members, holding and inclining the first member to the second at any desired angle by virtue of friction.

2. Description of the Related Art

Lap-top personal computers and word processors comprise a main body and a rotatable unit such as a display unit, and a hinge device coupling the unit rotatably to the main body. Various hinge devices of this type are known, one of which has a bearing fastened to the main body, and a shaft rotatably supported by the bearing and connected at an end to the rotatable unit.

Some of the conventional hinge devices further have friction means designed to hold and incline the rotatable unit to the main body at a desired angle. The friction means includes a resilient member such as a wave spring or a belleville spring. The resilient member is interposed and compressed between the bearing and the flange formed on the shaft, thus exerting a friction force between the bearing and the flange. By virtue of this frictional force, the rotatable unit is held and inclined to the main body at any desired angle. If an external force greater than the frictional force is applied to the unit, the unit will be rotated in the direction the external force is applied.

The frictional force which the resilient member generates is applied in the axial direction of the shaft. The resilient member should have a greater spring constant than in the case where the frictional force is applied in the radial direction of the shaft. Further, the frictional force much depends on the size of the resilient member. If the resilient member has a size different from the design one, or has its size reduced due to wear, the frictional force will change greatly. To eliminate or reduce this change in the frictional force, a shim may be inserted between the resilient member and the flange or the bearing. The use of the shim is an addition of a component, and it is not easy to select the shim from many, which has the most appropriate thickness.

Since the resilient member exerts a force in the axial direction of the shaft, it needs to have a relatively large outside diameter in order to obtain an appropriate frictional drag. Consequently, the friction means is proportionally large, which makes it difficult to miniaturize the hinge device.

SUMMARY OF THE INVENTION

The object of the present invention is to provide a hinge device which is small and simple in structure, and which can, nevertheless, exert an appropriate frictional force.

To attain the object, according to the invention, there is provided a hinge device for coupling a first member rotatably to a second member, said hinge device comprising:

a bearing member to be fastened to the first member, having a base portion and a hollow cylindrical portion having an axial through hole having a circular cross section;

a shaft passing through the hole of the cylindrical portion, contacting the inner circumferential surface of the cylindrical portion, and to be connected at one end to the second member; and tightening means for tightening the cylindrical portion onto the circumferential surface of the shaft.

The tightening means generates a frictional force between the circumferential surface of the shaft and the inner circumferential surface of the cylindrical portion. By virtue of this frictional force, the second member can be held and inclined to the first member at a desired angle.

BRIEF DESCRIPTION OF THE DRAWINGS

FIG. 13 is a front view showing the bearing member used in the hinge device shown in FIG. 12;

FIG. 14 is a front view illustrating a modification of the bearing member shown in FIG. 13;

FIG. 15 is a sectional view, taken along line A—A in FIG. 14;

DETAILED DESCRIPTION OF THE PREFERRED EMBODIMENTS

The hinge device according to a first embodiment of the invention will now be described, with reference to FIGS. 1 to 7.

Figure 1:
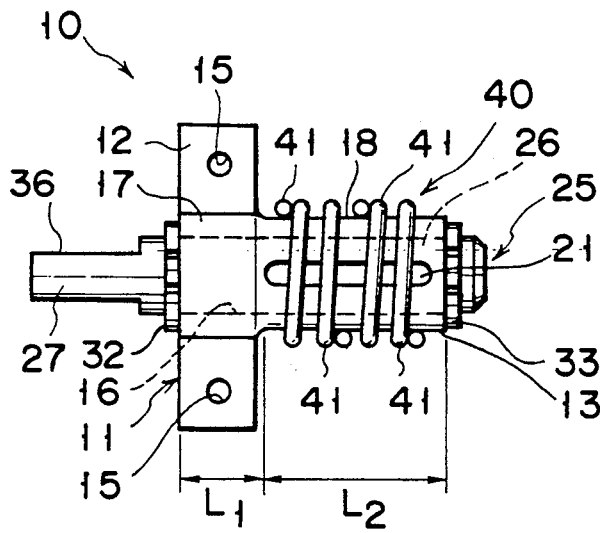
FIG. 1 is a front view illustrating a hinge device according to a first embodiment of the present invention.
Figure 2:
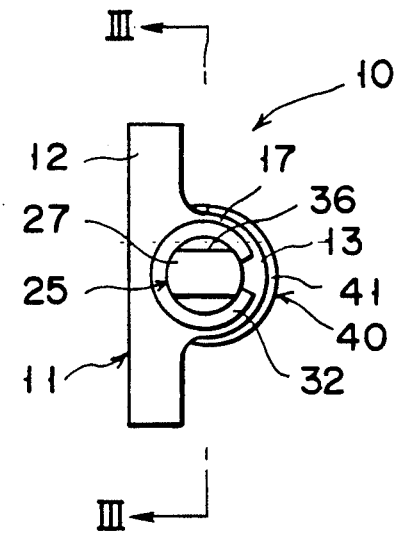
FIG. 2 is a side view of the hinge device shown in FIG. 1.
Figure 3:
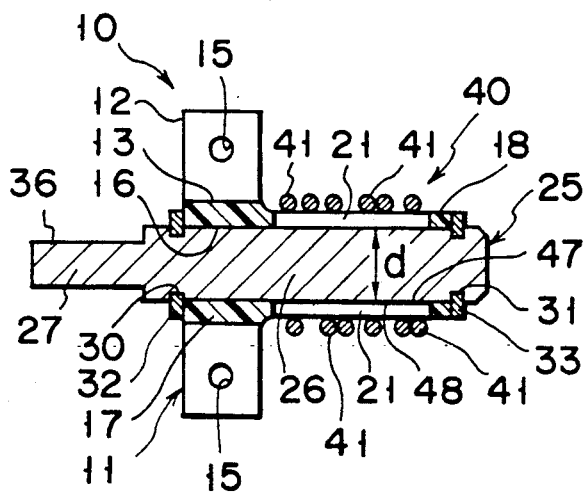
FIG. 3 is a sectional view, taken along line III—III in FIG. 2.
Figure 4:
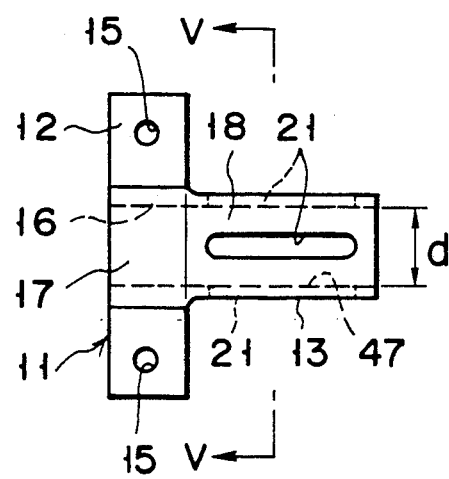
FIG. 4 is a front view showing the bearing member of the hinge device shown in FIG. 1.
Figure 5:
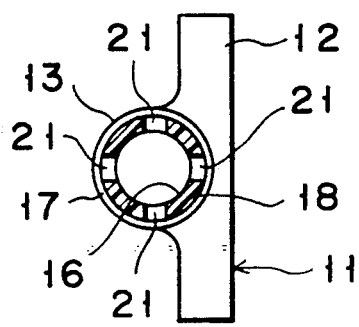
FIG. 5 is a sectional view, taken along line V—V in FIG. 4.

As is shown in FIG. 1, the hinge device 10 comprises a bearing member 11, a shaft 25, and a tightening member 40. The bearing member 11 has a base portion 12 and a hollow cylindrical portion 13 integral with the portion 12. The portion 12 has holes 15 so that it can be fastened by screws (not shown) to a first member 51, thereby to couple the first member to a second member 52 by means of the hinge device 10.

The bearing member 11 is made of, for example, a synthetic resin such as polyacetal. Instead, the member 11 may be made of other wear-resistant synthetic resin, preferably engineering plastic. The portion 13 has a through hole 16 extending in the axial direction of the portion 13.

As is illustrated in FIG. 1, the cylindrical portion 13 consists of a thick-wall section 17 having a length $L_1$ and a sleeve section 18 coaxial with the section 17 and having a length $L_2$. The sleeve section 18 has the same inside diameter as the section 17 and a smaller outside diameter than the section 17. In other words, it has a smaller wall thickness than thickwall section 17. The sleeve section 18 has slits 21 extending parallel to the axis of the section 18 and spaced apart at regular intervals in the circumferential direction of the sleeve section 18.

The shaft 25, which is made of metal such as stainless steel, extends through the hole 16 of the cylindrical portion 13. It consists of a straight columnar portion 26 and a connection end 27 formed on one end of the columnar portion 26. Annular grooves 30 and 31 are formed in the end portions of the columnar portion 26, respectively. Stop rings 32 and 33, for example C-ringes, are fitted in these annular grooves 30 and 31. The distance between the stop rings 32 and 33 is slightly longer than the length $(L_1+L_2)$ of the hollow cylindrical portion 13. Hence, the shaft 25 is prevented to move in the axial direction of the hollow cylindrical portion 13 by means of the rings 32 and 33. The connection end 27 has a pair of flat surfaces 36. The columnar portion 26 has an outside diameter nearly equal to, or slightly greater than, the inside diameter d which the hollow cylindrical portion 13 has when it is not tightened by the tightening member 40.

Figure 6:
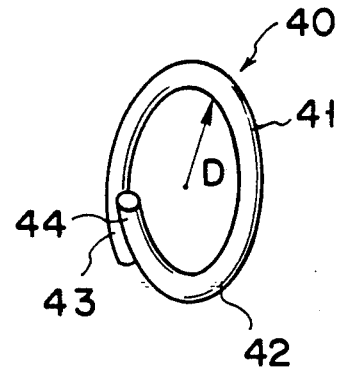
FIG. 6 is a perspective view of a tightening member used in the hinge device shown in FIG. 1.

The tightening member 40, which is mounted on the sleeve section 18, thus tightening the section 18, consists of four identical ring springs 41, one of which is illustrated in FIG. 6. The ring springs 41 are spaced apart from one another in the axial direction of the sleeve section 18. They have been made by bending lengths 42 of metal wire, such as stainless steel wire, into rings. As is shown in FIG. 6, each of the springs 41 has two free ends 43 and 44. The inside diameter D which the ring springs 41 have in their free state is smaller than the outside diameter of the sleeve section 18. Hence, once mounted on the sleeve section 18, the springs 41 tighten the section 18, reducing the diameter of the section 18. As a result, the inner circumferential surface 47 of the section 18 contacts the circumferential surface 48 of the shaft 25, whereby a frictional force is generated between the surface 47 and the surface 48.

Figure 7:
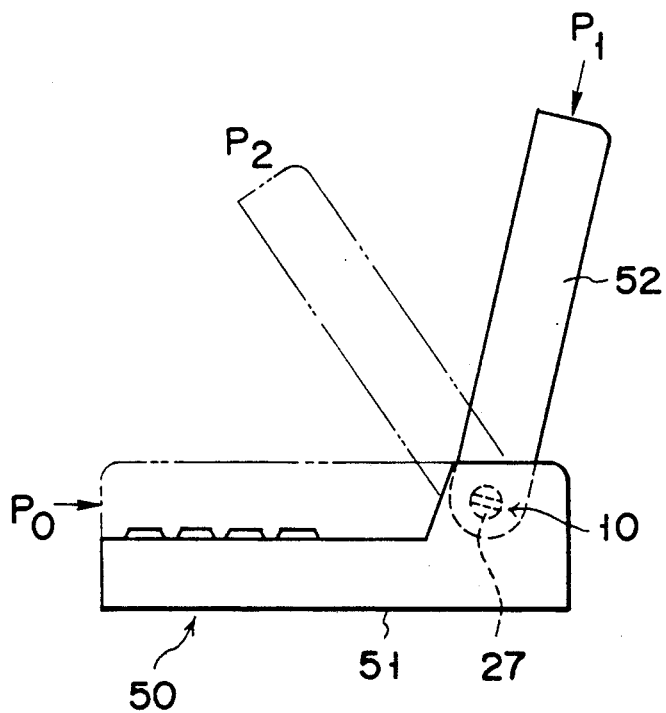
FIG. 7 is a side view of an apparatus in which the hinge device of FIG. 1 is incorporated.

The hinge device 10, described above, can be used in the apparatus 50 illustrated in FIG. 7. As is shown in this figure, the apparatus 50 comprises a main body 51 (a first member), a rotatable display unit 52 (a second member), and two hinge devices 10 (only one shown) coupling the display unit 52, at the lower-left and lower-right portions, to the main body 51. More specifically, the base portion 12 of the bearing member 11 of either hinge device 10 is fastened to the main body 51, and the connection end 27 of the shaft of the hinge device 10 is connected to the display unit 52. Hence, the display unit 52 can be rotated around the shaft 25 between a closed position $P_0$ where it covers the top of the main body 51 and an opened position $P_1$ where it is held upright from the main body 51.

The frictional force generated between the inner circumferential surface 47 of the cylindrical portion 13 and the circumferential surface 48 of the shaft 25 is great enough to hold the display unit 52 at any position $P_2$ between the closed position $P_0$ and the opened position $P_1$. This is because both surfaces 47 and 48 are large. If an external force greater than the frictional force is applied to the display unit 52, the unit 52 will be rotated in the direction in which the external force is exerted. In order to increase the frictional force between the surfaces 47 and 48, a number of small projections may be formed on the surface 47 or the surface 48, or both.

Figure 8:
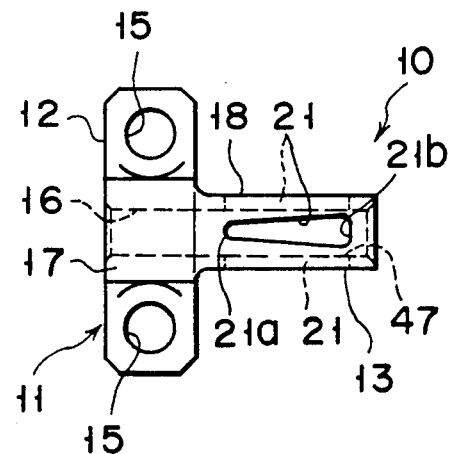
FIG. 8 is a front view of a modification of the bearing member.

FIG. 8 illustrates a modification of the bearing member 11. This modification is characterized by slits 21, each of whose width gradually increases from one end $21a$ toward the other end $21b$. When the modified bearing member 11 is used in the hinge device 10, and the tightening member 40 is mounted on the sleeve section 18 of the member 11, a frictional force is generated between the surfaces 47 and 48, which gradually varies in the axial direction of the shaft 25.

Figure 9:
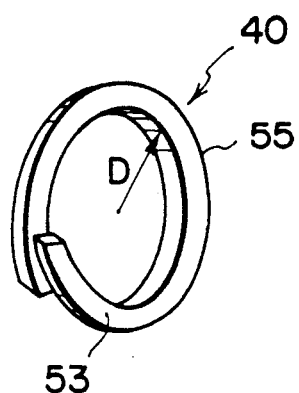
FIGS. 9 and 10 are perspective views showing two modifications of the tightening member.
Figure 10:
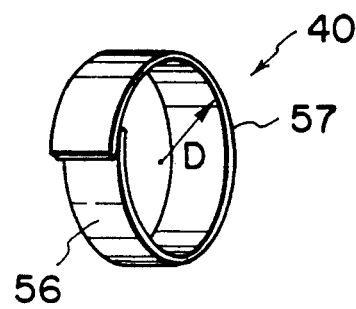
Figure 11:
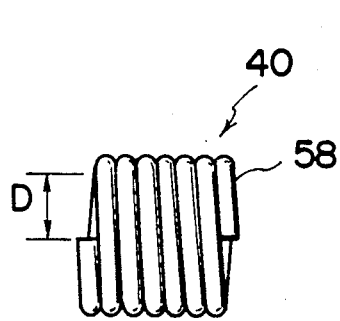
FIG. 11 is a front view illustrating another modification of the tightening member.

The tightening member 40 may consist of ring springs 55 shown in FIG. 9, which are made of lengths 53 of wire having a square cross section, or ring springs 57 shown in FIG. 10, which are made of lengths of strip-shaped spring elements 56. Furthermore, the tightening member 40 may be such a coil spring 59 illustrated in FIG. 11.

Figure 12:
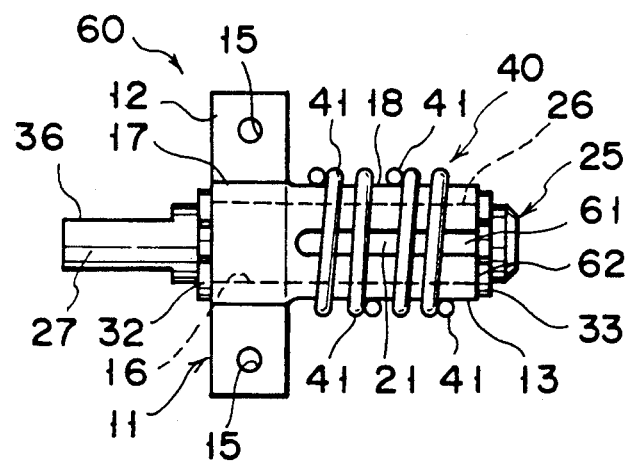
FIG. 12 is a front view a hinge device according to a second embodiment of the invention.

A hinge device 60 according to a second embodiment of the present invention will now be described, with reference to FIGS. 12 and 13. The hinge device 60 is identical to aforesaid hinge device 10, except that slits 21 of the bearing member 11 have an end 61 open at the end face 62 of the hollow cylindrical portion 13. Obviously, the sleeve section 18 of the cylindrical portion 13 can bend more readily than that in the hinge device 10 (FIG. 1). Thus, the tightening member 40 tightens the sleeve section 18 onto the circumferential surface 48 of the shaft 25 with sufficient firmness.

In both the first embodiment (FIGS. 1 and 4) and the second embodiment (FIGS. 12 and 13), the sleeve section 18 has four slits. According to the invention, the number of slits is not limited to four. For instance, the sleeve section 18 may have only one slit.

FIGS. 14 and 15 show another modification of the bearing member 11. This modified bearing member 11 is characterized by the sleeve section 18 having grooves 65 formed in the outer circumferential surface and extending parallel to the axis of the section 18. Since those portions of the section 18 in which bottoms 66 of the grooves 65 are formed are thinner than the remaining portions, the sleeve section 18 can be bent inwardly in its axial direction. When the sleeve section 18 is bent this way, the entire inner circumferential surface contacts the circumferential surface of the shaft 25.

Figure 16:
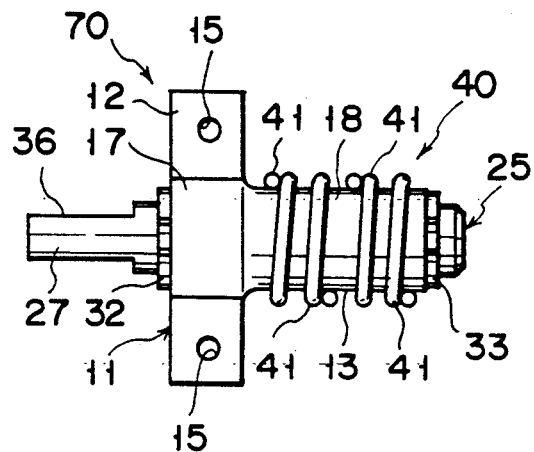
FIG. 16 is a front view illustrating a hinge device according to a third embodiment of the present invention.
Figure 17:
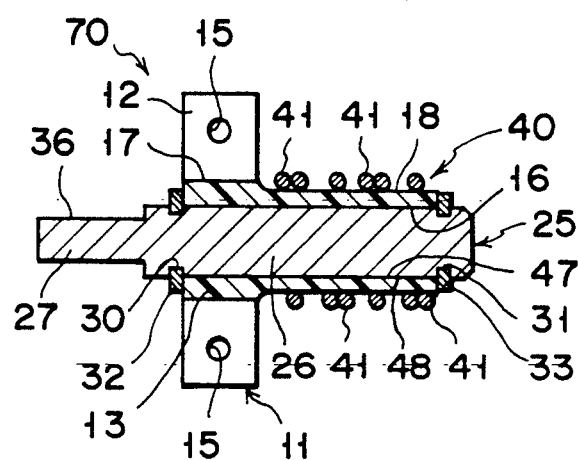
FIG. 17 is a sectional view of the hinge device shown in FIG. 16.

FIGS. 16 and 17 illustrate a hinge device 70 according to a third embodiment of the invention. This hinge device is identical to the first and second embodiments, except that the sleeve section 18 has neither slits nor grooves. The sleeve section 18, which is much thinner than the thick-wall section 17, is bent inward in its radial direction, thus tightening the shaft 25.

Figure 18:
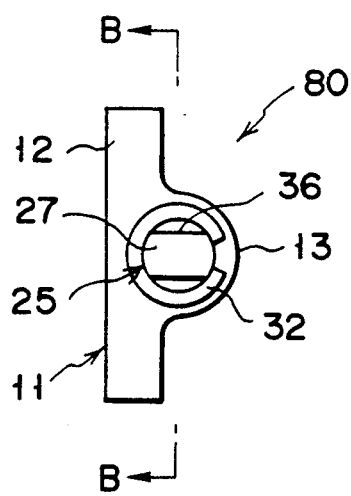
FIG. 18 is a side view showing a hinge device according to a fourth embodiment of the invention.
Figure 19:
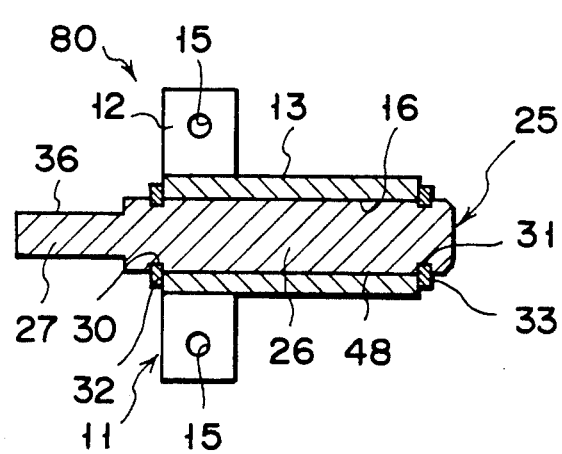
FIG. 19 is a sectional view, taken along line B-B in FIG. 18.

FIGS. 18 and 19 shows a hinge device 80 according to a fourth embodiment of the invention. This device 80 is different from the embodiments described above in three respects. First, the shaft 25 has a diameter slightly larger than the inside diameter of the cylindrical portion 13. Secondly, no springs equivalent to ring springs 41 are used. Thirdly, either the cylindrical portion 13 or the shaft 25 is made of synthetic resin and can, hence, be readily deformed. Since the shaft 25 is inserted in the hole 16 of the portion 13 and has a diameter is slightly greater than that of the hole 16, an appropriate frictional force is generated between the shaft 25 and the cylindrical portion 13.

The hinge device according to this invention can be used, not only in the apparatus shown in FIG. 7, but also in any other type of an apparatus which has a rotatable member. Further, it can be used to support doors or the covers of various apparatuses.

What is claimed is:

1. A hinge device for coupling a first member rotatably to a second member, said hinge device comprising:
   (a) a bearing member to be fastened to said first member, said bearing member comprising:
      a base portion; and
      a hollow cylindrical portion having an axial through hole having a circular cross section;
      said hollow cylindrical portion comprising:
         a thick-wall section formed integrally with said base portion; and
         a sleeve section having an axis, said sleeve section being coaxial with said thick-wall section, and having an inside diameter substantially the same as that of said thick-wall section and an outside diameter smaller than that of said thick-wall section;
   (b) a shaft passing through said axial through hole of said hollow cylindrical portion, said shaft contacting an inner circumferential surface of said hollow cylindrical portion and adapted to be connected at one end to said second member; and
   (c) tightening means mounted on said sleeve section of said hollow cylindrical portion for tightening said sleeve section onto a circumferential surface of said shaft.

2. The hinge device according to claim 1, wherein said tightening means comprises ring springs wound around said cylindrical portion, said ring springs having an inside diameter which is smaller than the outside diameter of said cylindrical portion when said ring springs are in a non-expanded state.

3. The hinge device according to claim 2, wherein said ring springs comprise bent lengths of spring wire, each having two free ends, which are formed into rings, and said ring springs are set apart from one another in the axial direction of said cylindrical portion.

4. The hinge device according to claim 2, wherein said ring springs comprise bent strip-shaped spring elements which are formed into rings.

5. The hinge device according to claim 1, wherein said tightening means comprises a coil spring.

6. The hinge device according to claim 1, wherein said sleeve section in a non-expanded state has an inside diameter not larger than the outside diameter of said shaft.

7. The hinge device according to claim 1, wherein said sleeve section has slits extending parallel to said axis of said sleeve section.

8. The hinge device according to claim 7, wherein said slits are spaced apart in the circumferential direction of said sleeve section.

9. The hinge device according to claim 7, wherein each of said slits has a first and second end, and each of said slits has a width gradually increasing from the first end toward the second end.

10. The hinge device according to claim 1, wherein said sleeve section has grooves which extend parallel to said axis of said sleeve section.

11. The hinge device according to claim 1, wherein said cylindrical portion has an inside diameter which is smaller than the diameter of said shaft over the entire length of said cylindrical portion.

12. The hinge device according to claim 1, wherein said bearing member is made of synthetic resin, and said shaft is made of metal.

13. The hinge device according to claim 1, wherein said bearing member is made of metal, and said shaft is made of synthetic resin.

14. A hinge device for coupling a first member rotatably to a second member, said hinge device comprising:
   (a) a bearing member to be fastened to said first member, said bearing member comprising:
      a base portion; and
      a hollow cylindrical portion having an axial through hole having a circular cross section;
   (b) a shaft passing through said axial through hole of said hollow cylindrical portion, said shaft contacting an inner circumferential surface of said hollow cylindrical portion and adapted to be connected at one end to said second member; and
   (c) tightening means mounted on said sleeve section of said hollow cylindrical portion for tightening said sleeve section onto a circumferential surface of said shaft; and
   wherein said bearing member is made of synthetic resin and said shaft is made of metal.

15. A hinge device for coupling a first member rotatably to a second member, said hinge device comprising:
   (a) a bearing member to be fastened to said first member, said bearing member comprising:
      a base portion; and
      a hollow cylindrical portion having an axial through hole having a circular cross section;
   (b) a shaft passing through said axial through hole of said hollow cylindrical portion, said shaft contacting an inner circumferential surface of said hollow cylindrical portion and adapted to be connected at one end to said second member; and
   (c) tightening means mounted on said sleeve section of said hollow cylindrical portion for tightening said sleeve section onto a circumferential surface of said shaft; and
   wherein said bearing member is made of metal and said shaft is made of synthetic resin.

* * * * *